United States Patent [19]
Iwase

[11] Patent Number: 6,048,106
[45] Date of Patent: Apr. 11, 2000

[54] OPTICAL MODULE INCLUDING AN OPTICAL CONNECTOR HAVING RETAINING MEMBERS

[75] Inventor: Masayuki Iwase, Ichihara, Japan

[73] Assignee: The Furukawa Electric Co., Ltd., Tokyo, Japan

[21] Appl. No.: 09/021,109

[22] Filed: Feb. 10, 1998

[30] Foreign Application Priority Data

Feb. 14, 1997 [JP] Japan .................................. 9-030899

[51] Int. Cl.⁷ ...................................... G02B 6/36

[52] U.S. Cl. .................. 385/88; 385/76; 385/59

[58] Field of Search ................... 385/88–94, 59, 385/56–60, 70–73, 76, 77, 78; 439/131, 946

[56] References Cited

U.S. PATENT DOCUMENTS

5,163,109  11/1992  Okugawa ................................. 385/94
5,845,027  12/1998  Bruch et al. .............................. 385/59

*Primary Examiner*—Phan T. H. Palmer
*Attorney, Agent, or Firm*—Frishauf, Holtz, Goodman, Langer & Chick, P.C.

[57] ABSTRACT

An optical module with which an optical connector is to be brought into abutment and connection by inserting guide pins into pin holes of the optical connector and then into pin holes of the optical module to thereby cause connection between the optical connector and the optical module. Retaining members for retaining the state of abutment and connection between the optical module and the optical connector are integrally mounted on the optical module or mounting portions on which the retaining members are removably mounted are integrally provided on the optical module.

18 Claims, 7 Drawing Sheets

OPTICAL MODULE INCLUDING AN OPTICAL CONNECTOR HAVING RETAINING MEMBERS

BACKGROUND OF THE INVENTION

1. Field of the Invention

The present invention relates to an optical module for use in optical communication and, more particularly, to an optical module on which an optical connector is removably attached.

2. Description of the Related Art

When optically connecting optical fibers to each other in an optical transmission line, there has hitherto been used an optical connector because this optical connector enables the optical fibers to be connected to each other in a simple manner and with high precision. As such an optical connector, there are known, for example, an MT (mechanically transferable) connector (IEC 61754-5) and an MPO (multi-path push-on) connector (IEC 61754-7) prepared by adding a removable-attachment function to the MT connector.

Here, the MT connector has a ferrule and an optical fiber one end of which is inserted into this ferrule. In this MT connector, two pin holes through which positioning guide pins are inserted are formed on both sides of the ferrule having the optical fiber located therebetween, and the guide pins are inserted through the respective pin holes to thereby perform positioning of the ferrules, whereby the one MT connector is made to abut on and connected with the other MT connector. At this time, with respect to the both MT connectors between which abutment and connection have been made, there is mounted a removably attachable clip consisting of a metal spring in such a way that the clip is extended to cover the both MT connectors, whereupon an appropriate level of pressing force is imparted between the connectors by the spring force of the clip. On the other hand, a spring is built in the MPO connector and, by being attached onto the adaptor with a one-touch operation, this MPO connector can be made to abut on and connected with another MPO connector.

Meanwhile, in the optical communication, there is used an optical module in which various optical parts are integrated together from the demand of downsizing. And, study also is being made of the simple connection between the optical module and the optical connector.

Here, in the MT connector, the metallic clip is mounted thereon for the purpose of retaining the state of connection. However, the clip is prepared by bending a metallic plate spring and, therefore, when an excessive stress is applied to the clip at the time of attachment thereof onto or detachment thereof from the connector, plastic deformation occurs with the result that the pressing force acting on the connector inconveniently weakens. For this reason, when attaching the clip onto the MT connector or detaching the clip therefrom, the use of a special jig was needed so that an excessive stress may be prevented from being applied to the clip.

On the other hand, the MPO connector has the problem that although it can be readily made to abut on and connected with another MPO connector with a one-touch operation, the structure of the MPO connector including an adaptor is complex and becomes inconveniently increased in size compared to the MT connector.

SUMMARY OF THE INVENTION

An object of the present invention is to provide an optical module which is simple in structure and with respect to which an optical connector is easily attached or detached without using a special jig.

To attain the above object, the optical module of the present invention is an optical module with which an optical connector is to be brought into abutment and connection by inserting guide pins into pin holes of the optical connector and then into pin holes of the optical module to thereby cause connection between the optical connector and the optical module, and in which retaining members for retaining the state of abutment and connection between the optical module and the optical connector are integrally mounted or mounting portions on which the retaining members are removably mounted are integrally provided.

Preferably, the retaining members are each made of superelastic metal material.

As the superelastic metal material there is, for example, a niobium/titanium alloy.

Here in this specification, the wording "optical module" is defined to mean an optical device, optical circuit or optical equipment having a certain kind of function used to construct an optical equipment, device or system.

According to the present invention, it is possible to inexpensively provide an optical module which is simple in structure and with respect to which an optical connector is easily attached or detached without using a special jig.

At this time, when molding the retaining members from superelastic metal material, even if an excessive stress acts on the retaining members at the time of attachment or detachment of the optical connector, the plastic deformation of the retaining members is suppressed.

The above and other objects, features and advantages of the present invention will become more apparent from the following detailed description taken in conjunction with the accompanying drawings.

DETAILED DESCRIPTION OF THE PREFERRED EMBODIMENTS

Embodiments of the present invention will now be explained in detail with reference to FIGS. 1 to 14.

First Embodiment

Figure 1:
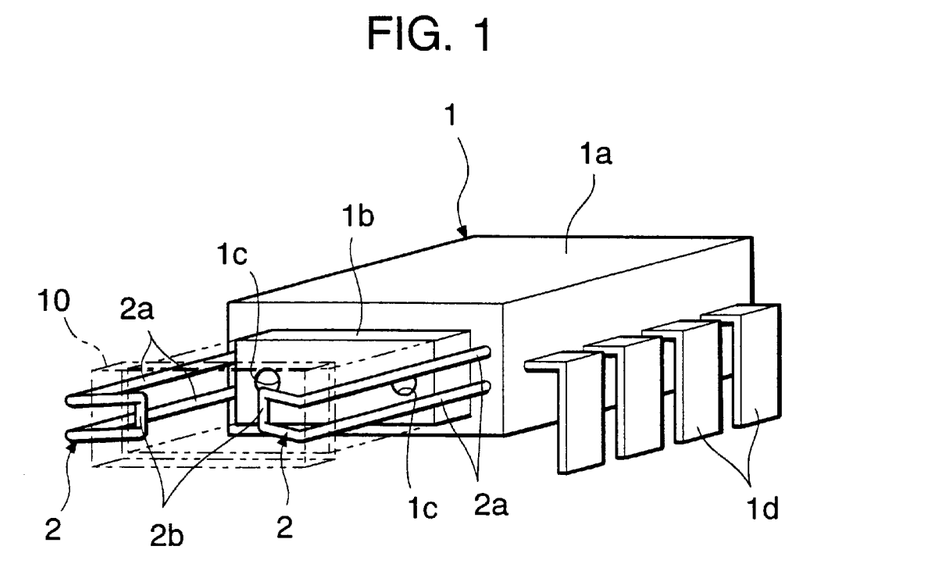
FIG. 1 is a perspective view illustrating a first embodiment of an optical module according to the present invention.

A first embodiment of an optical module according to the present invention will be explained first with reference to FIGS. 1 to 3.

An optical module 1 has a main body 1a consisting of plastic such as epoxy resin. On a front portion of the main body 1a there is formed a protruding portion 1b. Two pin holes 1c are provided on both sides of the main body 1a and protruding portion 1b as viewed widthwise thereof. In the optical module 1, optical parts such as a laser diode (LD) or a photodiode (PD) are accommodated within the main body 1a thereof and lead frames 1d are extended from each side of the main body 1a. Also, in the optical module 1, two clips 2 are integrally mounted on both sides of the main body 1a having the protruding portion 1b located therebetween, respectively.

The clips 2 are each a retaining member which realizes the simple attachment/detachment between the optical module 1 and an optical connector such as a MT connector. The clip 2 is integrally fixed to the main body 1a of the optical module 1 when this main body 1a is molded by insert molding or the like, or, after the main body 1a has been molded, is mounted on the main body 1a by adhesion or the like. Each clip 2 is formed by bending a single superelastic metal wire. The clip 2 has an arm portion 2a extended from the main body 1a and having a length corresponding to that of the optical connector 10 and a retaining portion 2b formed by bending the wire inwardly. The retaining portion 2b elastically abuts on a rear end surface 10e as later described of the optical connector 10 when the optical connector 10 has been made to abut on and connected with the optical module 10, thereby pressing the optical connector 10 toward the protruding portion 1b side.

By using superelastic metal, e.g., niobium/titanium alloy wherein Nb 50 to 52 at % of austenite starts to be transformed at a temperature of −40° C. or less, the clip 2 can have a superelasticity of between −40° C. and 85° C. With regard to the clip 2 using this material, when using a wire having a diameter of, for example, 0.5 mm, the tensile strength is 2 kgf or more. This value satisfies a necessary condition of 1 Kgf or more required of the clip used in the MT connector.

Here, the optical connector 10 is, for example, an MT connector which has a ferrule 10a and a tape fiber 10b. The ferrule 10a is provided with pin holes 10c at the positions corresponding to the respective pin holes 1c on both sides of the optical module 1 as viewed widthwise thereof. The ferrule 10a is formed with an abutting end surface 10d at a front portion thereof and is formed with a rear end surface 10e at a rear portion thereof.

The optical module 1 of this embodiment which has the above-described construction is attached to or detached from the optical connector 10 as follows.

When causing the optical connector 10 to abut on and connecting the same to the optical module 1, first, guide pins 11 (see FIG. 2) are inserted into the respective pin holes 1c with prescribed lengths thereof being kept protruding.

Next, the ferrule 10a is disposed between the two clips 2 while extending the retaining portion 2b of each clip 2 widthwise outwardly along with the arm portion 2a thereof against the elastic force thereof. And, the abutting end surface 10d is made to abut on the protruding portion 1b while inserting the guide pins 11 through the respective pin holes 10c.

When, subsequently, releasing the extended retaining portion 2b, the retaining portion 2b of each clip 2 abuts on the rear end surface 10e of the optical connector 10 and the arm 2a thereof abuts on the corresponding side of the ferrule 10a.

Figure 2:
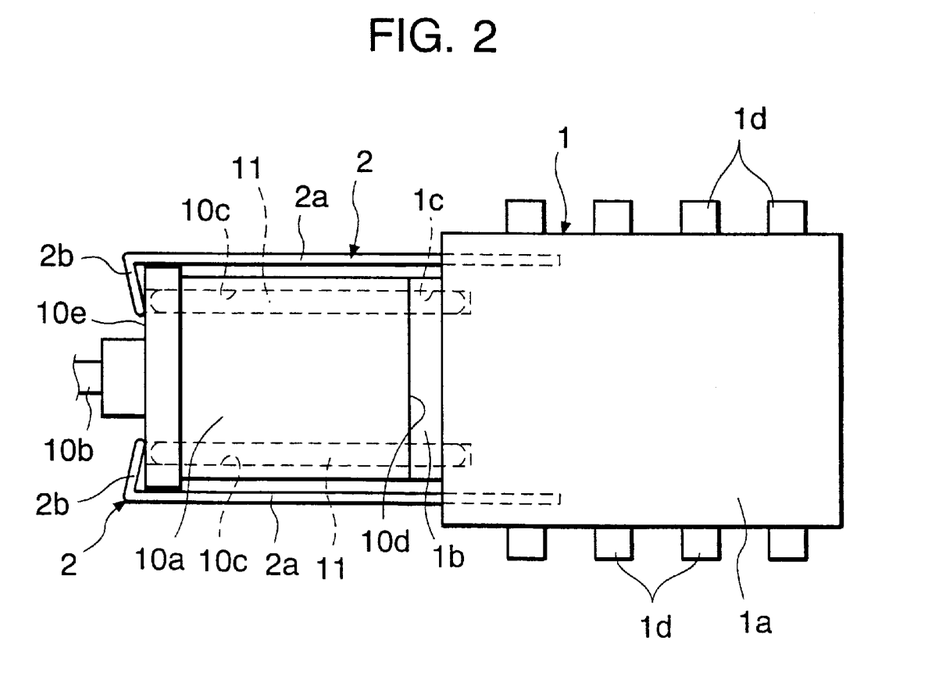
FIG. 2 is a plan view illustrating a state where an optical connector is made to abut on and connected with the optical module of FIG. 1.
Figure 3:
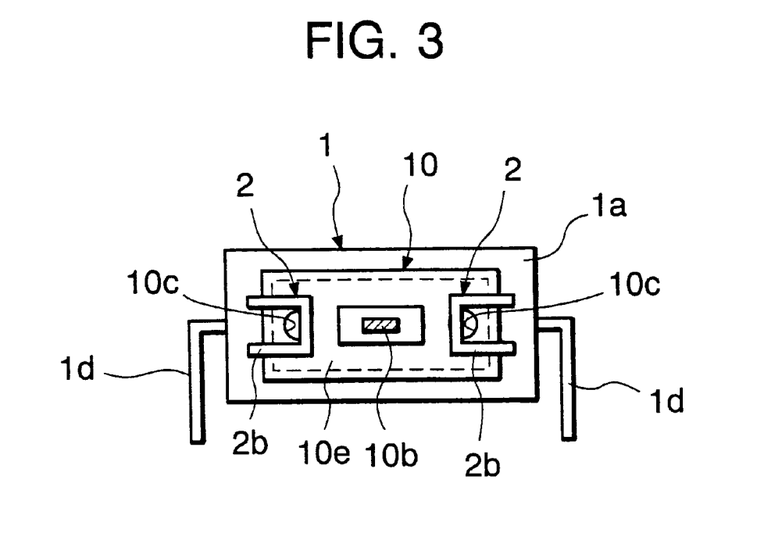
FIG. 3 is a left side view of FIG. 2.

As a result of this, as illustrated in FIG. 2, the optical module 1 and the optical connector 10 are positioned by the guide pins 11 and are thereby readily made to abut on and connected to each other. And, the optical connector 10 which has been brought into abutment and connection with the optical module 1 is pressed in the direction of the abutment onto the optical module 1 by the elastic force acting from the retaining portions 2b of the clip 2, whereupon the state of connection between the two is maintained to be excellent.

On the other hand, when releasing the abutment/connection between the optical module 1 and the optical connector 10, the operations which are reverse from the above-described operations are performed.

That is, first, the retaining portions 2b of the clip 2 are extended or spread rearwardly outwardly to thereby release the abutment of the retaining portions 2b upon the rear end surface 10e of the optical connector 10.

Next, in this state, the optical connector 10 is pulled in the longitudinal direction and thereby disconnected from the optical module 1, with the result that the abutment and connection between the optical module 1 and the optical connector 10 are released.

In this way, the optical module 1 can have the optical connector 10 attached thereto or detached therefrom in a simple manner even if no special jig is used. Because of its being simple in structure, the optical module 1 can be provided inexpensively.

Second Embodiment

Next, a second embodiment of the optical module according to the present invention will be explained with reference to FIGS. 4 to 7.

Here, in the explanations of optical modules in the following respective embodiments and in the figures used in such explanations, there are correspondingly used the reference numerals that represent the respective portions of the optical module 1 of the first embodiment, and, since the optical connector 10 is the same in structure, the same reference numerals are used to represent the respective portions thereof, detailed explanations of which are omitted.

Figure 4:
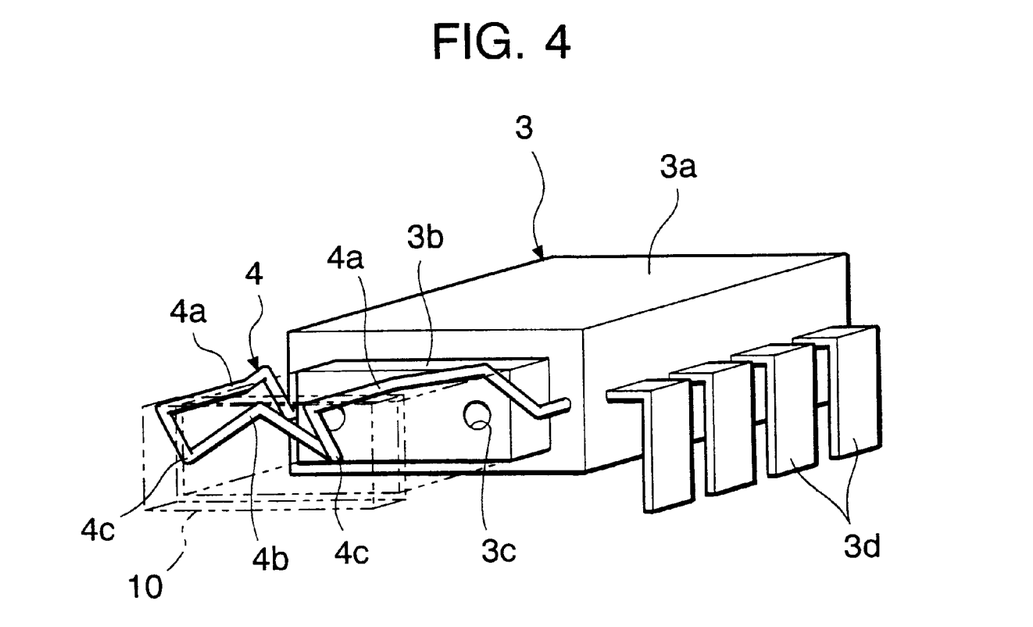
FIG. 4 is a perspective view illustrating a second embodiment of the optical module according to the present invention.

As illustrated in FIG. 4, an optical module 3 has a main body 3a at a front portion of which there is integrally mounted a clip 4.

Figure 5:
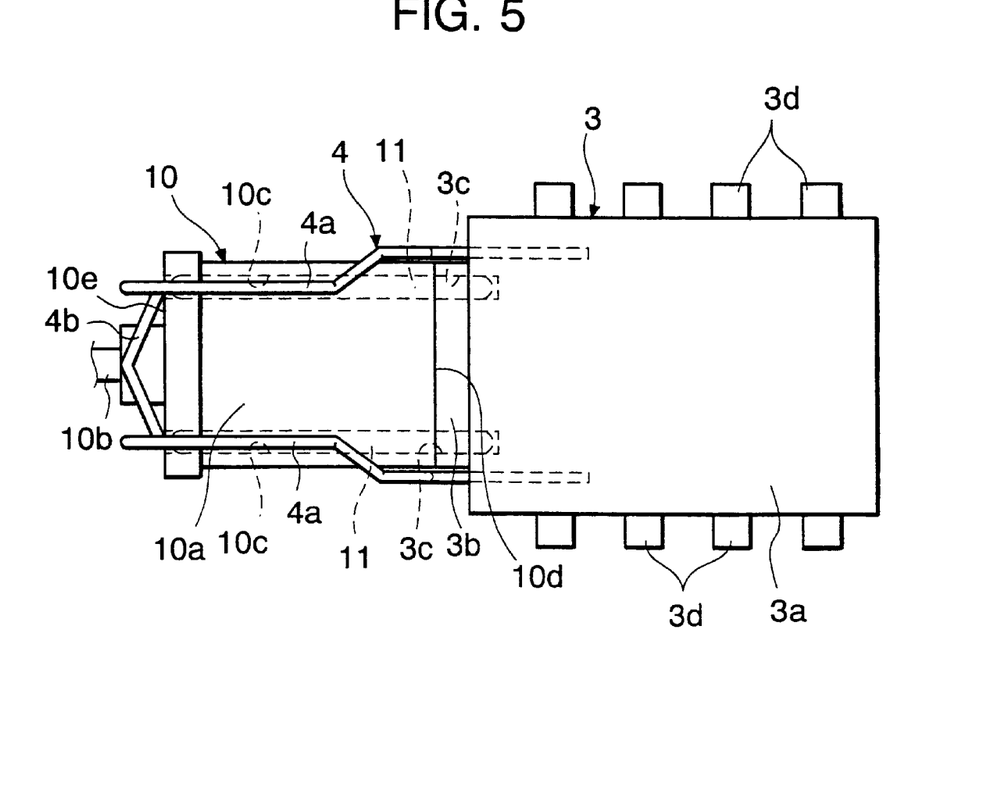
FIG. 5 is a plan view illustrating a state where an optical connector is made to abut on and connected with the optical module of FIG. 4.
Figure 6:
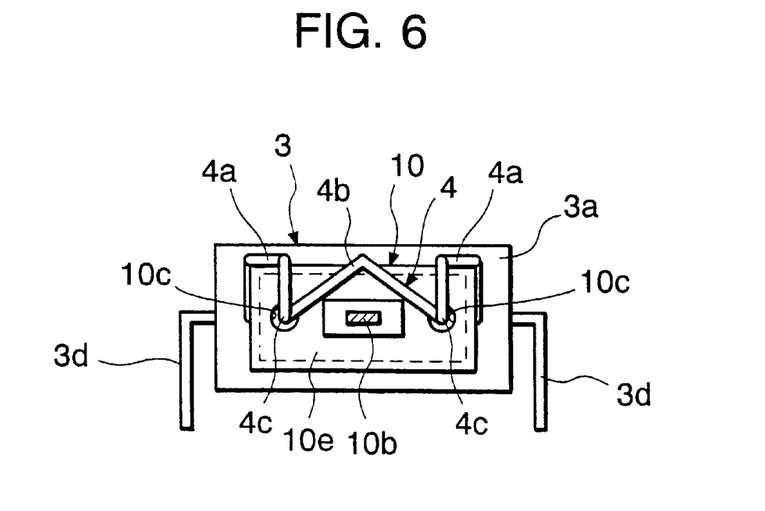
FIG. 6 is a left side view of FIG. 5.
Figure 7:
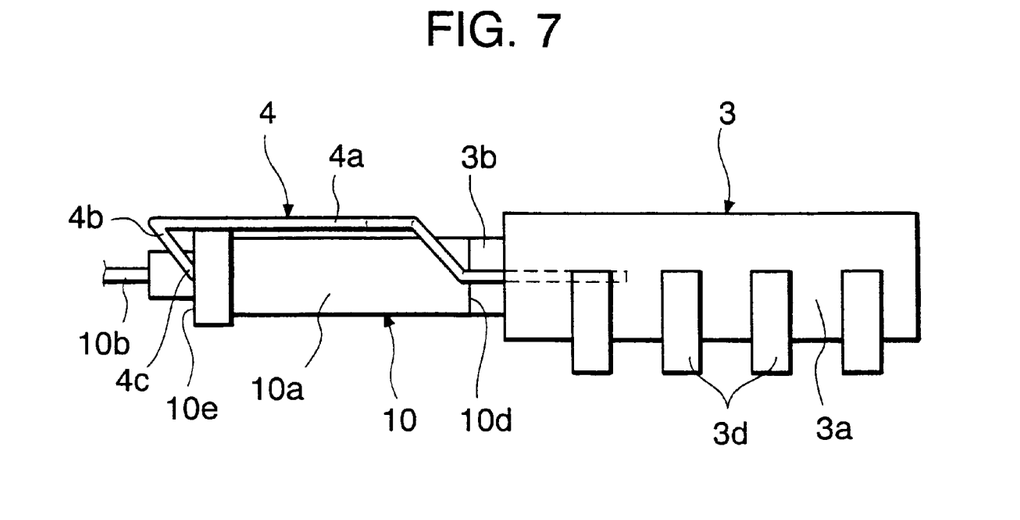
FIG. 7 is a front view of FIG. 6.

The clip 4 is a retaining member formed by bending a single superelastic metal wire consisting of the same material as that in the case of the first embodiment. As illustrated in FIGS. 5 to 7, the clip 4 has arm portions 4a disposed on both sides of the main body 3a having a protruding portion 3b located therebetween and a W-shaped elastic portion 4b formed on forward ends of the arm portions 4a. With respect to the elastic portion 4b there are respectively formed two retaining portions 4c at two positions thereof which are respectively on both sides corresponding to the pin holes 10c of the ferrule 10a.

When causing the optical connector 10 to abut on and connecting the same to the optical module 3, first, guide pins 11 (see FIG. 5) are inserted into the respective pin holes 3c with prescribed lengths thereof being kept protruding.

Next, the elastic portion 4b of the clip 4 is raised upward against the elastic force and an abutting end surface 10d is made to abut on the protruding portion 3b while inserting the guide pins 11 through the respective pin holes 10c of the ferrule 10a.

When, subsequently, releasing the raised elastic portion 4b, the elastic portion 4b of the clip 4 is returned to its original position and, as illustrated in FIG. 6, the respective retaining portions 4c are elastically retained in the pin holes 10c on the rear end surface 10e of the ferrule 10a.

As a result of this, as illustrated in FIG. 5, the optical module 3 and the optical connector 10 are positioned by the guide pins 11 and are thereby readily made to abut on and connected to each other. And, the optical connector 10 which has been brought into abutment and connection with the optical module 3 is pressed in the direction of the abutment onto the optical module 3 by the elastic force acting from the respective retaining portions 4c of the clip 4, whereupon the state of connection between the two is maintained to be excellent.

On the other hand, when releasing the abutment/connection between the optical module 3 and the optical connector 10, the operations which are reverse from the above-described operations are performed to thereby release the retention of the retaining portions 4c on the pin holes 10c. By doing so, the optical connector 10 can readily be disconnected from the optical module 3.

Third Embodiment

Figure 8:
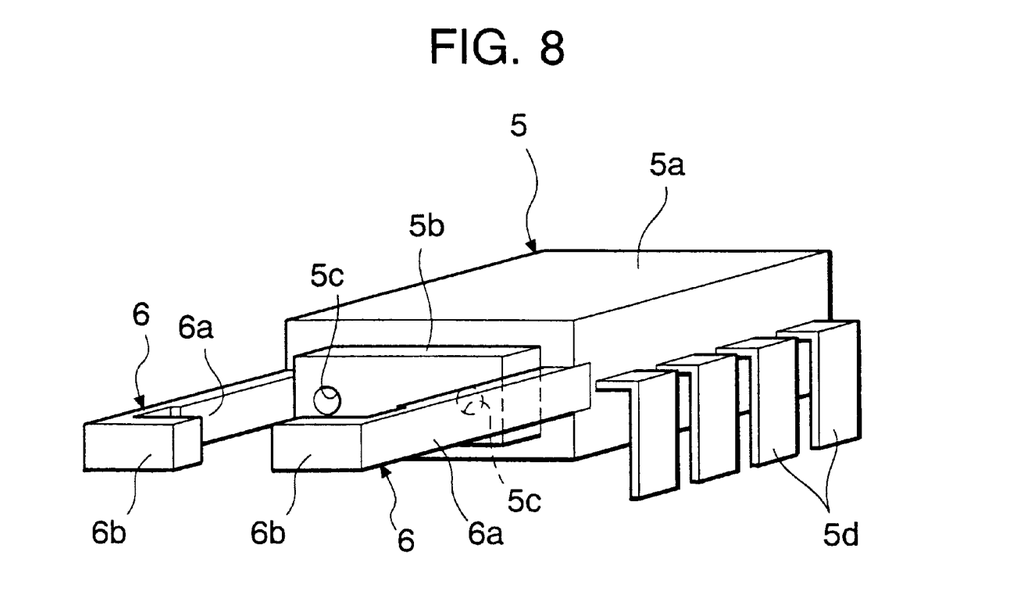
FIG. 8 is a perspective view illustrating a third embodiment of the optical module according to the present invention.
Figure 9:
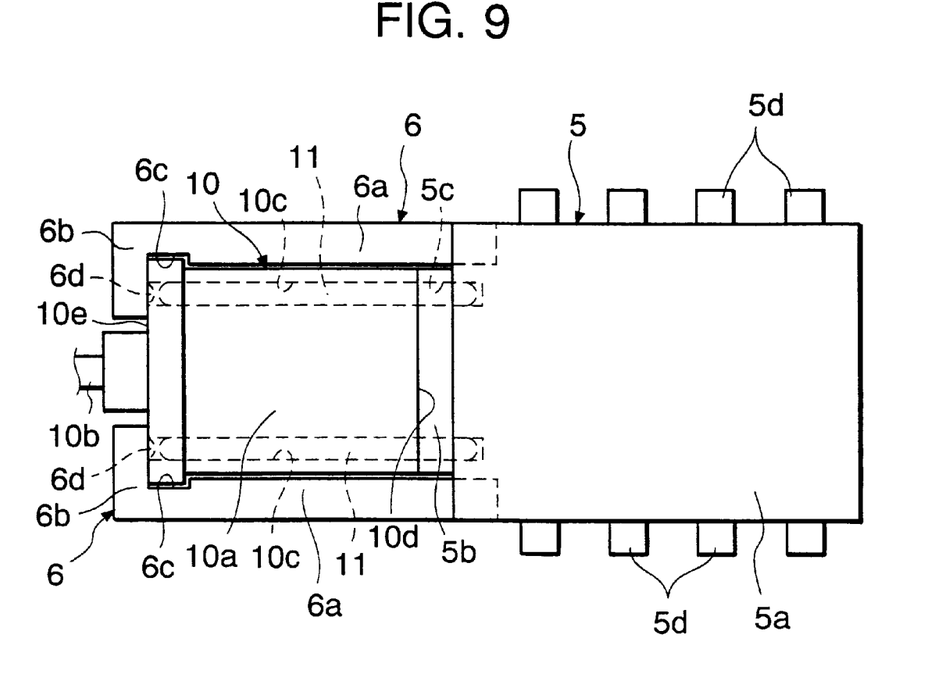
FIG. 9 is a plan view illustrating a state where an optical connector is made to abut on and connected with the optical module of FIG. 8.
Figure 10:
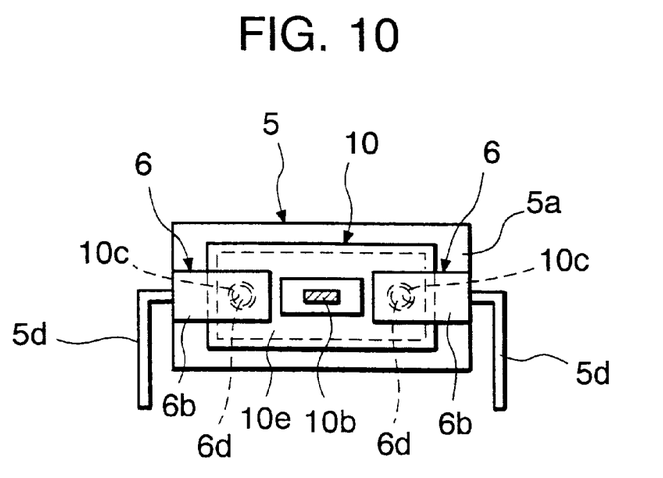
FIG. 10 is a left side view of FIG. 9.

Also, FIGS. 8 to 10 illustrate a third embodiment of the optical module according to the present invention. As illustrated in FIG. 8, an optical module 5 has two clip plates 6 mounted thereon on both sides of a main body 5a having a protruding portion 5b located therebetween.

The clip plates 6 are retaining members each formed by bending a single superelastic metal plate consisting of the same material as that in the case of the first embodiment, each retaining member consisting of an L-shaped plate mounted on each corresponding side of the main body 5a as illustrated in FIGS. 9 and 10. The clip plate 6 has an arm portion 6a and a retaining portion 6b formed on a forward end of the arm portion 6a. The arm portion 6a is provided with a recess portion 6c at a portion adjacent to the retaining portion 6b. On the other hand, each retaining portion 6b is formed with a semi-spherical protrusion 6d at a position corresponding to a pin hole 10c of a ferrule 10a.

And, when causing the optical connector 10 to abut on and connecting the same to the optical module 5, guide pins 11 (see FIG. 9) are inserted into respective pin holes 5c with prescribed lengths being kept protruding and the retaining portions 6b of the respective clip plates 6 are spread widthwise outwardly along with the arm portions 6a against the elastic force.

Next, the ferrule 10a is disposed between the two clip plates 6 and the abutting end surface 10d is made to abut on the protruding portion 5b while inserting the guide pins 11 through the respective pin holes 10c.

When, subsequently, releasing the forcedly spread retaining portions 6b, the retaining portions 6b of the clip plates 6 abut on the rear end surface 10e of the optical connector 10 and the arm portions 6a thereof abut on the side surfaces of the ferrule 10a. At this time, the semi-spherical protrusions 6d of the retaining portion 6b are engaged with the pin holes 10c of the ferrule 10a, whereby the optical connector 10 is positioned with respect to the optical module 5 by the protrusions 6d as well as by the guide pins 11.

As a result of this, as illustrated in FIG. 9, the optical module 5 and the optical connector 10 are positioned by the guide pins 11 and are thereby readily made to abut on and connected to each other. And, the optical connector 10 which has been brought into abutment and connection with the optical module 5 is pressed in the direction of the abutment onto the optical module 5 by the elastic force acting from the respective retaining portions 6b of the clip plates 6, whereupon the state of connection between the two is maintained to be excellent.

On the other hand, when releasing the abutment/connection between the optical module 5 and the optical connector 10, the operations which are reverse from the above-described operations are performed to thereby release the retention of the retaining portions 6b on the rear end surface 10e. By doing so, the optical connector 10 can readily be disconnected from the optical module 5.

Fourth Embodiment

Next, a fourth embodiment of the optical module according to the present invention will be explained with reference to FIGS. 11 to 14.

Figure 11:
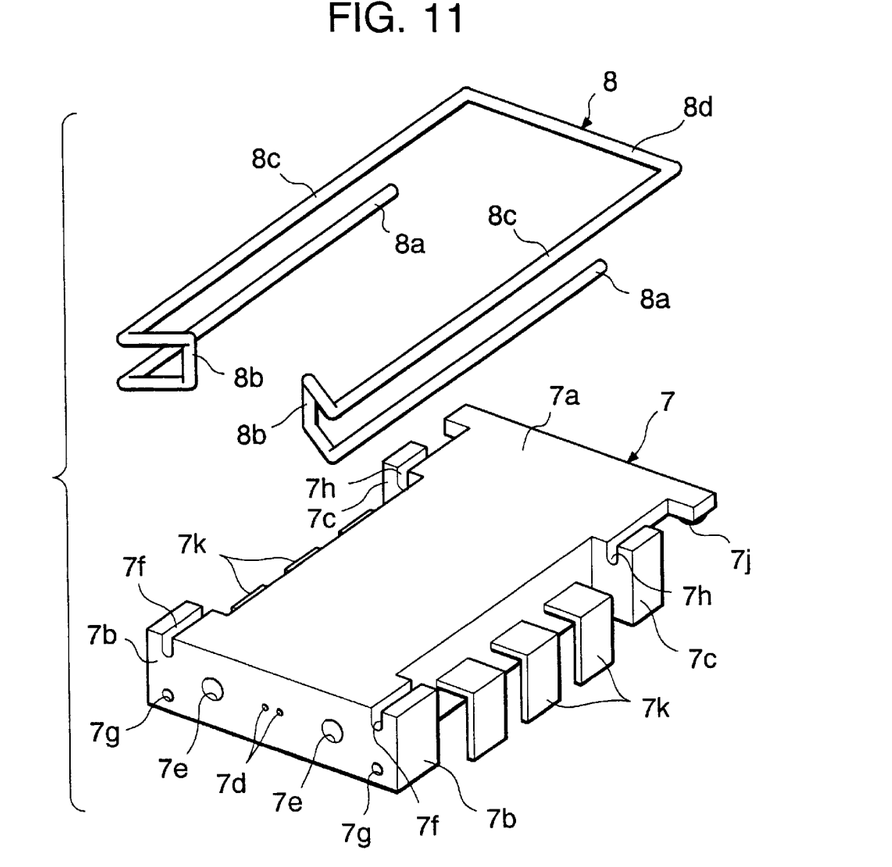
FIG. 11 illustrates a fourth embodiment of the optical module according to the present invention and includes perspective views illustrating the optical module on which a clip is removably mountable and the clip respectively.

As illustrated in FIG. 11, an optical module 7 is formed with first mounting portions 7b and second mounting portions 7c on which a clip 8 is removably mounted on both sides of a main body 7a and these portions 7b and 7c are molded integrally therewith from plastic such as epoxy resin. The main body 7a has two optical fibers 7d mounted at a center thereof as viewed widthwise thereof and has two pin holes 7e formed on both sides thereof having the optical fibers 7d located therebetween. The first mounting portions 7b are each formed with an insertion/attachment groove 7f at their upper portions and are each formed with an insertion hole 7g at positions lower than the insertion/attachment grooves 7f. The second mounting portions 7c are each formed with an insertion/attachment groove 7h at positions corresponding to the insertion/attachment grooves 7f. Also, the optical module 7 is formed with a stopper 7j at a rear portion of the main body 7a rear from the insertion/attachment grooves 7h formed in the second mounting portions 7c. In the optical module 7, within the main body 7a, there are accommodated a laser diode (LD), a photo-diode (PD), etc. and from side surfaces of the main body 7a there are extended lead frames 7k.

Figure 12:
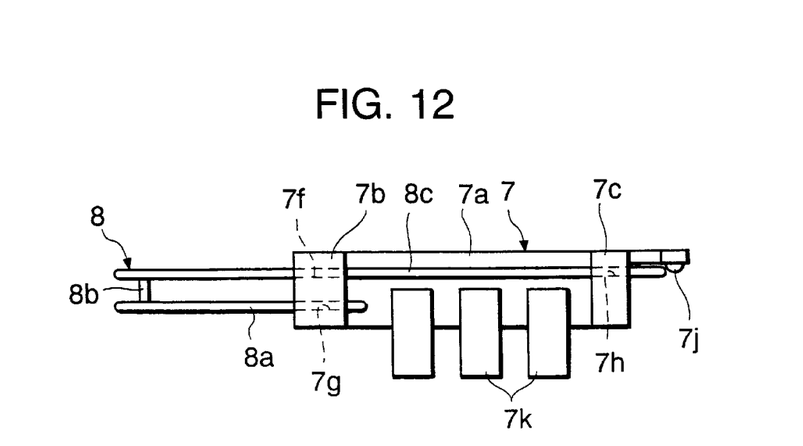
FIG. 12 is a side view of the optical module of FIG. 11 having the clip mounted thereon.

On the other hand, the clip 8 is a retaining member formed by bending a single superelastic metal wire consisting of the same material as that in the case of the first embodiment. As illustrated in FIG. 11, the clip 8 has guide portions 8a, retaining portions 8b, arm portions 8c and a bridge portion 8d and is shaped as a whole like a character U. The guide portions 8a are inserted through the insertion holes 7g of the first mounting portions 7b to thereby guide the back-and-forth movement of the clip 8. When the optical module 7 has been brought into abutment/connection with the optical connector 10, the retaining portions 8b are retained on the rear end surface 10e of the ferrule 10a. The arm portions 8c are inserted and attached with respect to the insertion/attachment grooves 7f and 7h and are thereby applied between the first mounting portions 7b and the second mounting portions 7c as illustrated in FIG. 12. When the clip 8 moves back and forth, the bridge portion 8d abuts on a rear portion of the optical module 7 and thereby regulates the drawout of the clip 8.

The optical module 7 constructed as mentioned above is used by having the clip 8 mounted thereon as illustrated in FIG. 12 such that the guide portions 8a are inserted through the insertion holes 7g of the first mounting portions 7b and the arm portions 8c are inserted and attached with respect to the insertion/attachment grooves 7f of the first mounting portions 7b and the insertion/attachment grooves 7h of the second mounting portions 7c.

At this time, when causing the optical connector to abut on and connecting the same to the optical module 7, guide pins 11 (see FIG. 9) are inserted into the respective pin holes 7e with prescribed lengths being kept protruding and the retaining portions 8b of the clip 8 are spread widthwise outwardly along with the arm portions 8c against the elastic force.

Next, the ferrule is disposed between the two arm portions 8c and the abutting end surface is made to abut on the front surface of the module 7 while inserting the guide pins 11 through the respective pin holes of the ferrule.

When, subsequently, releasing the forcedly spread retaining portions 8b, the retaining portions 8b of the clip 8 abut on the rear end surface of the optical connector and the arm portions 8c thereof abut on the side surfaces of the ferrule.

As a result of this, the optical module 7 and the optical connector are positioned by the guide pins 11 and are thereby readily made to abut on and connected to each other. And, the optical connector which has been brought into abutment and connection with the optical module 7 is pressed in the direction of the abutment onto the optical module 7 by the elastic force acting from the respective retaining portions 8b of the clip 8, whereupon the state of connection between the two is maintained to be excellent.

On the other hand, when releasing the abutment/connection between the optical module 7 and the optical connector, the operations which are reverse from the above-described operations are performed to thereby release the retention of the respective retaining portions 8b on the rear end surface of the ferrule. By doing so, the optical connector can readily be disconnected from the optical module 7.

Figure 13:
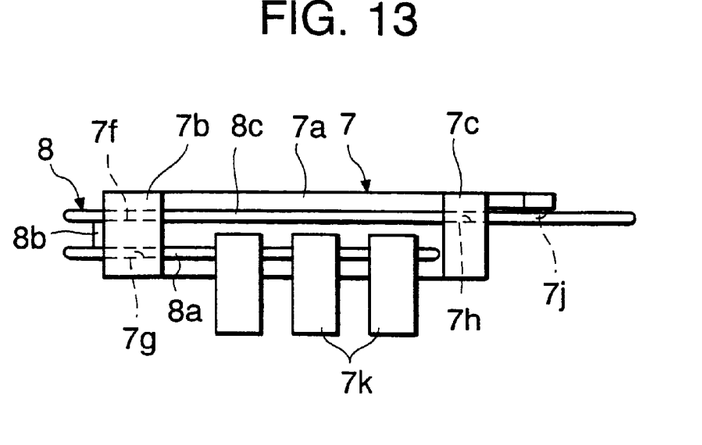
FIG. 13 is a side view wherein in the optical module of FIG. 12 the clip is in a non-use state where the clip has been intruded to the optical module side.

Further, at the time of non-use of the clip 8 when abutment and connection are not made between the optical module 7 and the optical connector, the clip 8 is intruded as illustrated in FIG. 13. At this time, when it is attempted to intrude the clip 8, this intrusion is regulated once by interference of the bridge portion 8d with the rear stopper 7j. However, when the clip 8 is further intruded, since the bridge portion 8d rides over the rear stopper 7j, the clip 8 can be easily intruded.

Here, as the optical module 7 there has been explained the optical module 7 whose first mounting portions 7b and second mounting portions 7c are molded integrally with the main body 7a. However, in a case where the optical module 7 is made up of two or more parts, the first mounting portions 7b and the second mounting portions 7c may be formed on any part only if, at the time when having assembled the two or more parts as the optical module 7, the clip 8 can be mounted on the resulting optical module 7.

Figure 14:
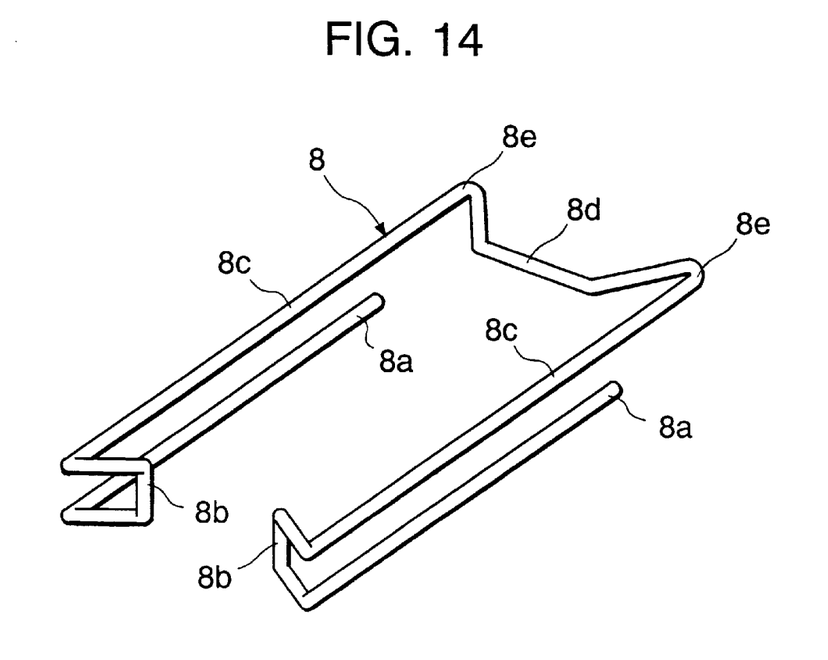
FIG. 14 is a perspective view illustrating a modification of the clip.

Also, when providing curved portions 8e on both sides of the bridge portion 8d as illustrated in FIG. 14, these curved portions 8e exhibit spring forces and this makes it possible to further impart the elastic force to the clip 8.

It is to be noted that although among the optical modules of the above-described embodiments there are the optical modules having the protruding portions formed on the front portions thereof against which the optical connectors abut, if abutment and connection can be made between the optical module 7 and the optical connector by means of the guide pins, the provision of the protruding portion is not essential as shown on the optical module 7 of the fourth embodiment.

What is claimed is:

1. An optical module with which an optical connector is abutted and connected, the optical module and optical connector having pin holes into which guide pins are inserted to thereby connect the optical connector and the optical module, wherein retaining members, made of superelastic metal wire, for retaining abutment and connection of the optical module and the optical connector are mounted such that the retaining members protrude from the optical connector or that mounting portions on which the retaining members are removably mounted are integrally provided on the optical module, and wherein the retaining members include arm portions formed by bending a single superelastic metal wire and which are disposed in a longitudinal direction of the optical connector, the retaining members also include retaining portions each formed by bending the single superelastic metal wire inwardly so as to elastically abut on a rear end surface of the optical connector to thereby press the optical connector in the direction of abutment and connection with respect to the optical module.

2. An optical module according to claim 1, wherein optical parts are accommodated within a main body of the optical module and lead frames are extended from the sides of the main body.

3. An optical module according to claim 2, wherein the main body is formed using synthetic resin.

4. An optical module according to claim 1, wherein the superelastic metal is a niobium/titanium alloy wherein the austenite begins transformation at a temperature of at most −40° C.

5. An optical module with which an optical connector is abutted and connected, the optical module and optical connector having pin holes into which guide pins are inserted to thereby connect the optical connector and the optical module, wherein retaining members, made of superelastic metal wire, for retaining abutment and connection of the optical module and the optical connector are mounted such that the retaining members protrude from the optical connector or that mounting portions on which the retaining members are removably mounted are integrally provided on the optical module, and wherein the retaining members include arm portions formed by bending a single superelastic metal wire and which are disposed in the longitudinal direction of the optical connector, the retaining members also include a W-shaped elastic portion formed on forward ends of the arm portions and formed at positions corresponding to the pin holes of the optical connector.

6. An optical module according to claim 5, wherein optical parts are accommodated within a main body of the optical module and lead frames are extended from the sides of the main body.

7. An optical module according to claim 6, wherein the main body is formed using synthetic resin.

8. An optical module according to claim 5, wherein the superelastic metal is a niobium/titanium alloy wherein the austenite begins transformation at a temperature of at most −40° C.

9. An optical module with which an optical connector is abutted and connected, the optical module and optical connector having pin holes into which guide pins are inserted to thereby connect the optical connector and the optical module, wherein retaining members, made of superelastic metal wire, for retaining abutment and connection of the optical module and the optical connector are mounted such that the retaining members protrude from the optical connector or that mounting portions on which the retaining members are removably mounted are integrally provided on the optical module, and wherein the retaining members include arm portions formed by bending the superelastic metal material into an L-shape shape and which are disposed in the longitudinal direction of the optical connector, the retaining members also include retaining portions on forward ends of the arm portions formed by inwardly bending the metal material.

10. An optical module according to claim 9, wherein optical parts are accommodated within a main body of the optical module and lead frames are extended from the sides of the main body.

11. An optical module according to claim 10, wherein the main body is formed using synthetic resin.

12. An optical module according to claim 9, wherein the superelastic metal is a niobium/titanium alloy wherein the austenite begins transformation at a temperature of at most −40° C.

13. An optical module according to claim 9, wherein the retaining portions are formed with semi-spherical protrusions at positions corresponding to the pin holes of the optical connector.

14. An optical module with which an optical connector is abutted and connected, the optical module and optical connector having pin holes into which guide pins are inserted to thereby connect the optical connector and the optical module, wherein retaining members, made of superelastic metal wire, for retaining abutment and connection of the optical module and the optical connector are mounted such that the retaining members protrude from the optical connector or that mounting portions on which the retaining members are removably mounted are integrally provided on the optical module, and wherein the retaining member is U-shaped and formed by bending a single superelastic metal wire, the retaining member includes guide portions inserted through mounting portions formed on both sides of the optical connector, the guide portions guide movement of the retaining member with respect to the optical module, the retaining member also includes retaining portions retained on a rear end surface of the optical connector, arm portions inserted and attached with respect to the mounting portions formed on both sides of the optical connector, and a bridge portion connecting the arm portions to each other and made to abut on a rear portion of the optical module to thereby regulate the drawout of the retaining member.

15. An optical module according to claim 14, wherein optical parts are accommodated within a main body of the optical module and lead frames are extended from the sides of the main body.

16. An optical module according to claim 15, wherein the main body is formed using synthetic resin.

17. An optical module according to claim 14, wherein the superelastic metal is a niobium/titanium alloy wherein the austenite begins transformation at a temperature of at most −40° C.

18. An optical module with which an optical connector is abutted and connected, the optical module and optical connector having pin holes into which guide pins are inserted to thereby connect the optical connector and the optical module, wherein retaining members, made of superelastic metal wire, for retaining abutment and connection of the optical module and the optical connector are mounted such that the retaining members protrude from the optical connector or that mounting portions on which the retaining members are removably mounted are integrally provided on the optical module, and wherein the retaining members include arm portions formed by bending a single superelastic metal wire and which are disposed in the longitudinal direction of the optical connector.

\* \* \* \* \*